United States Patent

[11] 3,600,581

| [72] | Inventor | Josef-Ferdinand Menke |
| | | Glucksburg, Germany |
| [21] | Appl. No. | 851,021 |
| [22] | Filed | Aug. 18, 1969 |
| [45] | Patented | Aug. 17, 1971 |
| [73] | Assignee | Eltro GmbH & Co. |
| | | Heidelberg, Germany |
| [32] | Priority | Aug. 16, 1968 |
| [33] | | Germany |
| [31] | | P 17 97 108.3 |

[54] IR-OPTICAL IMAGE REPRODUCING SYSTEM AND METHOD
6 Claims, 1 Drawing Fig.

[52] U.S. Cl. ..................................................... 250/83 R,
250/83.3 H, 250/238
[51] Int. Cl. ..................................................... G01t 1/16
[50] Field of Search................................. 250/83.3, 83.3 UV, 216, 238; 350/2

[56] References Cited
UNITED STATES PATENTS

| 3,103,587 | 9/1963 | Ure, Jr. et al. ................ | 250/83.3 |
| 3,173,012 | 3/1965 | De Winter ..................... | 250/83.3 |
| 3,189,746 | 6/1965 | Slobodin et al. .............. | 250/216 |
| 3,303,340 | 2/1967 | Hewett et al. ................. | 250/83.3 X |
| 3,463,929 | 8/1969 | Laurent ........................ | 250/216 |

Primary Examiner—James W. Lawrence
Assistant Examiner—Davis L. Willis
Attorney—Waters, Roditi, Schwartz and Nissen ABSTRACT: An IR-optical image reproduction system which comprises an objective, a field lens and collimator arranged in optical series. The objective focuses the incoming image at an image plane and the field lens is positioned at this plane. The collimator forms a parallel beam path of smaller diameter than that of the image entering the objective. A stop is positioned in the path and is provided with an aperture which permits the passage of the parallel beam while blocking heat rays which might be generated upstream of the stop. A second objective receives the parallel beam and focuses an image at a receiver all which responds to the IR content thereof. This cell has a determinable operating temperature and a cooling apparatus is provided which cools the system between the collimator and the cell to a temperature which is close to that of the cell. A beam splitter can be provided which operates on the parallel beam and with this beam splitter is associated another objective and receiver cell. A cooling apparatus is also provided to operate with this additional structure.

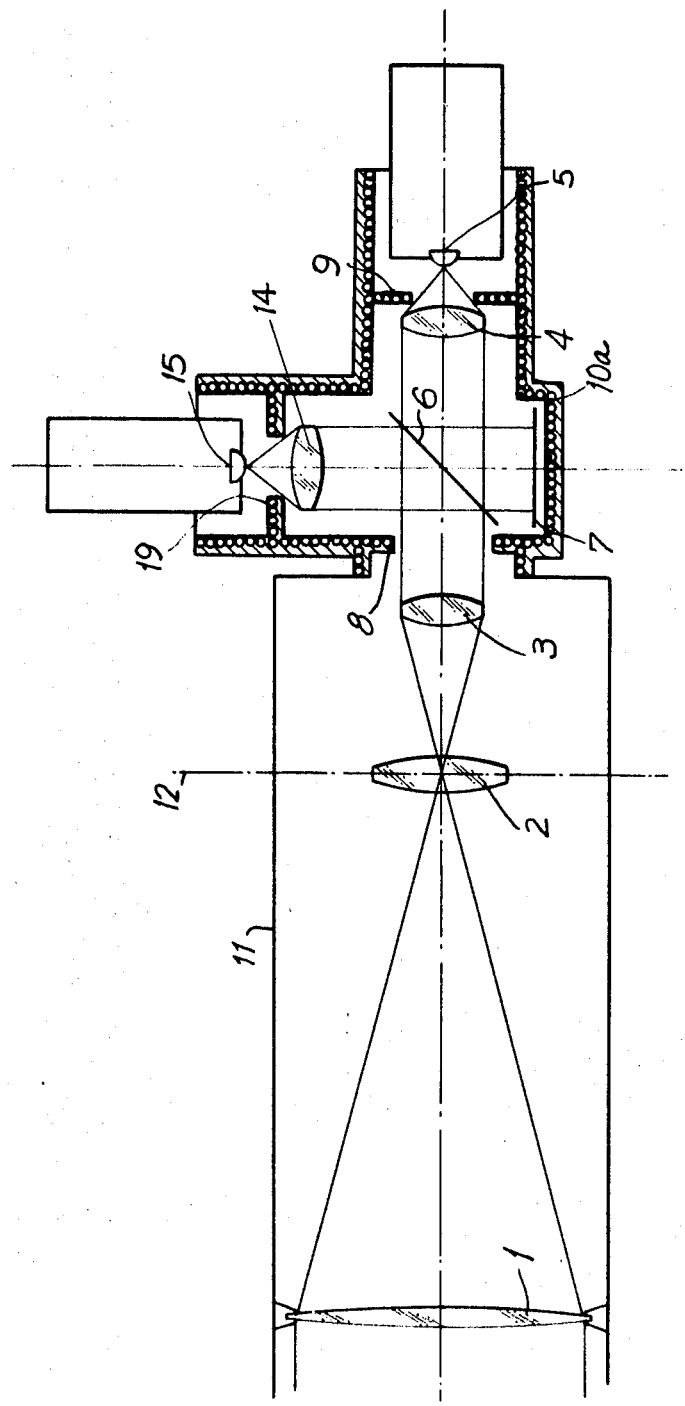

IR-OPTICAL IMAGE REPRODUCING SYSTEM AND METHOD

DRAWING

The sole FIGURE is a schematic representation of one embodiment of the invention.

DETAILED DESCRIPTION

The invention relates to an IR-optical image reproduction system, and more particularly to methods and devices for the protection of such a system against interference radiation.

IR-optical systems are particularly vulnerable to stray or interference radiation because the energy of the radiation, which they are intended to receive, is generally extremely weak. Minute amounts of heat convection, such as can be caused by the differential between the temperature of the equipment housing and the temperature inside of the equipment can, for example, cause a noticeable deterioration of the useful radiation received.

An object of the invention is to provide for keeping away, from the receiver cells in an IR-optical system, all stray radiation due to heat convection. For this purpose, the bundle of rays entering the system is, first of all, focused in an image plane and thereafter again converted into a parallel-ray bundle of smaller diameter by a consecutive optical system or collimator.

According to the invention, a pupil is defined by a field lens by an intermediate image in the parallel bundle, and the entire portion of the system lying behind the collimator is maintained at a temperature very close to the operating temperature of the receiver cells, whereas all heat rays emitted in the system portion ahead of the collimator are captured and absorbed by a cooled stop arranged behind the collimator.

By this procedure, on the one hand, any emission of heat rays in the rear portion of the system is positively prohibited and, on the other hand, heat rays emitted in the forward portion, for example, by the housing, are blocked out by the stop.

The use of stops in photoreceivers as protection against interference radiation is already known. The conventional, cooled photoreceivers possess an aperture stop which clips the bundle of rays of the image reproducing or collector system. Stops of this kind, however, result in limited protection only against interference radiation, because they do not provide a well-defined pupil restriction.

In an IR-optical image reproduction system having a receiving objective for bundling the entering rays, a field lens in the image plane, a collimator for conversion of the bundle of rays into a beam path of smaller diameter consisting of parallel rays, and at least one receiver cell arranged behind a second objective in the parallel beam path, the invention is applied by arranging behind the collimator a cooled stop which will let through the useful rays exclusively. Since the portion of the system following the collimator is cooled, so that no new stray radiation can be generated, a radiation free from interference rays is supplied to the receiver cell or cells.

As an increased safeguard against the entrance of interference rays into the receiver cells, additional cooled aperture stops may be arranged in front of these cells.

For protection also of the beam path between the first cooled aperture stop and the second objective, and of that objective itself, it is advantageous to accommodate the first aperture stop, the beam path between it and the second objective, as well as the second objective itself inside a common housing cooled externally. The receiver cell is also preferably comprised in this housing. Moreover, there can be accommodated in this common externally cooled housing, if useful, a beam splitter, the second beam path associated with same, as well as the corresponding third objective.

In the embodiment of the invention schematically represented in the drawing, the IR-optical image reproduction system consists of an objective 1, a field lens 2, a collimator 3, a second objective 4 and a receiver cell 5. The incoming rays are focused by the objective 1 at the image plane 12, and are reconverted into a parallel ray path of smaller diameter by the collimator 3. An objective 4, arranged at the end of the parallel ray path, bundles the rays anew and leads them to the receiver cell 5. For definition of the pupil in the parallel beam, the field lens 2 is arranged in the image plane 12.

Heat rays emitted by the wall of the housing 11 are captured behind the collimator 3 in the parallel ray path by an aperture stop 8. In order to prevent additional interference radiation, coming from the wall of housing 10, from entering the beam path, the housing 10, according to the invention, is cooled to a temperature in the neighborhood of the temperature of the receiver cell. The cooling device comprises a system of pipes 10a through which the cooling medium, for instance liquid nitrogen, is flowing. The stops to be cooled can be connected to this system. Additionally, a further aperture stop 9 can be arranged behind the objective 4, which will further assure against the penetration of interference radiation into the receiving element.

If a beam splitter 6 is provided, it will also be appropriately arranged inside the cooled housing 10 in the parallel beam path. In this case, another objective 14 with a consecutive aperture stop 19 and receiving element 15 are employed for the split-off portion of the rays.

If, in connection with the beam splitter 6, a mirror 7 is utilized for reflecting the radiation emanating from the receiver element in autocollimation, it is preferable to arrange this mirror likewise inside the cooled housing 10.

What I claim is:

1. A method comprising optically receiving an image with a first diameter, focusing the image and collimating the same into a bundle of parallel rays of smaller diameter than said first diameter, transducing the IR content of said bundle into energy of a different form, and arranging a constricted passage for said bundle to prevent the passage therewith of ambient thermal energy otherwise capable of passing along with said bundle, and effecting a temperature reduction along said bundle prior to the transducing to avoid the introduction of ambient heat.

2. An IR-optical image reproduction system comprising an objective, a field lens and a collimator arranged in optical series, the objective focusing an incoming image at an image plane and the field lens being positioned at said plane, said collimator forming a parallel beam path of smaller diameter than that of the image entering said objective, a cooled stop positioned in said path and provided with an aperture to permit the passage of the parallel beam while blocking heat rays generated upstream of the stop, optical means including a second objective and a receiver cell downstream of said collimator, said second objective focusing an image at said receiver cell, said cell having a determinable operating temperature, and cooling means positioned in front of said receiver for cooling said optical means downstream of said collimator to a temperature close to that of said cell.

3. A system as claimed in claim 2 comprising cooled stop means between said second objective and said receiver cell.

4. A system as claimed in claim 2 comprising beam splitting means disposed in the parallel beam path of the collimator, a further objective and a second receiver cell disposed to receive the radiation reflected from the beam splitting means, a further stop means between said further objective and cell, and cooling means to cool the stop means.

5. A system as claimed in claim 4 wherein all components downstream of the collimator are mounted in a cooled housing.

6. A system as claimed in claim 4 comprising a reflective mirror operatively associated with said beam splitting means and with said cooled stop means.